United States Patent
Okutani et al.

(10) Patent No.: US 9,419,304 B2
(45) Date of Patent: Aug. 16, 2016

(54) NONAQUEOUS ELECTROLYTE SECONDARY BATTERY

(71) Applicant: SANYO Electric Co., Ltd., Moriguchi-shi, Osaka (JP)

(72) Inventors: Eiji Okutani, Kasai (JP); Yoshinori Yokoyama, Itano-gun (JP); Takayuki Hattori, Minamiawaji (JP); Yasuhiro Yamauchi, Sumoto (JP)

(73) Assignee: SANYO Electric Co., Ltd., Daito-shi (JP)

(*) Notice: Subject to any disclaimer, the term of this patent is extended or adjusted under 35 U.S.C. 154(b) by 317 days.

(21) Appl. No.: 13/962,101

(22) Filed: Aug. 8, 2013

(65) Prior Publication Data

US 2014/0045020 A1    Feb. 13, 2014

(30) Foreign Application Priority Data

Aug. 9, 2012  (JP) .................. 2012-177274

(51) Int. Cl.
*H01M 8/02* (2016.01)
*H01M 10/0563* (2010.01)
(Continued)

(52) U.S. Cl.
CPC .......... *H01M 10/0563* (2013.01); *H01M 2/22* (2013.01); *H01M 2/263* (2013.01); *H01M 10/045* (2013.01); *H01M 10/0431* (2013.01); *H01M 10/052* (2013.01); *H01M 10/0567* (2013.01); *H01M 10/0587* (2013.01);
(Continued)

(58) Field of Classification Search
CPC .................. Y02E 60/122; H01M 10/0431
USPC .............................................. 429/94
See application file for complete search history.

(56) References Cited

U.S. PATENT DOCUMENTS 5,439,760 A    8/1995   Howard et al.
6,040,082 A    3/2000   Haas et al.
(Continued)

FOREIGN PATENT DOCUMENTS

JP    10-340740 A    12/1998
JP    2000268877 A    9/2000
(Continued)

OTHER PUBLICATIONS

Office Action dated Dec. 18, 2014, issued in U.S. Appl. No. 13/962,256. (14 pages).

(Continued)

*Primary Examiner* — Mark F Huff
*Assistant Examiner* — Monique Wills
(74) *Attorney, Agent, or Firm* — Westerman, Hattori, Daniels & Adrian, LLP (57) ABSTRACT

A nonaqueous electrolyte secondary battery according to an embodiment of the invention includes: a flat electrode assembly including a positive electrode and a negative electrode; a bottomed prismatic hollow outer can storing the flat electrode assembly and a nonaqueous electrolyte and having an opening portion; and a sealing plate sealing the opening portion of the hollow outer can. The nonaqueous electrolyte contains at least one of a lithium salt having an oxalate complex as an anion and lithium difluorophosphate ($LiPF_2O_2$). The outer surface area of a battery outer body including the hollow outer can and the sealing plate is 350 $cm^2$ or more. With this configuration, the nonaqueous electrolyte secondary battery has excellent battery characteristics.

15 Claims, 6 Drawing Sheets

(51) Int. Cl.
*H01M 10/04* (2006.01)
*H01M 2/22* (2006.01)
*H01M 2/26* (2006.01)
*H01M 10/052* (2010.01)
*H01M 10/0567* (2010.01)
*H01M 10/0587* (2010.01)

(52) U.S. Cl.
CPC .......... *H01M2220/20* (2013.01); *Y02E 60/122* (2013.01); *Y02T 10/7011* (2013.01)

(56) References Cited

U.S. PATENT DOCUMENTS

| | | | |
|---|---|---|---|
| 6,365,299 | B1 | 4/2002 | Miyaki et al. |
| 7,255,965 | B2 | 8/2007 | Xu et al. |
| 9,093,718 | B2 | 7/2015 | Dietz et al. |
| 9,112,236 | B2 | 8/2015 | Miyagi et al. |
| 2004/0048152 | A1 | 3/2004 | Yata et al. |
| 2005/0202320 | A1 | 9/2005 | Totir et al. |
| 2006/0166078 | A1 | 7/2006 | Chen et al. |
| 2007/0196729 | A1 | 8/2007 | Yamauchi et al. |
| 2008/0305402 | A1 | 12/2008 | Kato et al. |
| 2009/0106970 | A1 | 4/2009 | Fan et al. |
| 2009/0233168 | A1* | 9/2009 | Yoshida .................. H01M 2/08 429/185 |
| 2009/0286155 | A1 | 11/2009 | Takehara |
| 2010/0015514 | A1 | 1/2010 | Miyagi et al. |
| 2010/0116533 | A1 | 5/2010 | Ishimatsu et al. |
| 2010/0203373 | A1 | 8/2010 | Kawase et al. |
| 2010/0216001 | A1 | 8/2010 | Byun et al. |
| 2010/0233524 | A1 | 9/2010 | Hina et al. |
| 2010/0323240 | A1 | 12/2010 | Tsujioka et al. |
| 2011/0052976 | A1 | 3/2011 | Ishii et al. |
| 2011/0111267 | A1 | 5/2011 | Van Schyndel |
| 2011/0183197 | A1 | 7/2011 | Byun et al. |
| 2011/0195286 | A1* | 8/2011 | Aota .................... H01M 2/263 429/94 |
| 2012/0021264 | A1 | 1/2012 | Morishima |
| 2012/0079713 | A1 | 4/2012 | Hosokawa et al. |
| 2012/0129055 | A1 | 5/2012 | Takahata et al. |
| 2012/0145428 | A1 | 6/2012 | Tokunaga et al. |
| 2012/0196178 | A1* | 8/2012 | Kambayashi ....... H01M 2/0456 429/179 |
| 2012/0214037 | A1 | 8/2012 | Hara et al. |
| 2012/0313570 | A1* | 12/2012 | Ohtaniuchi ....... H01M 10/0525 320/103 |
| 2014/0045016 | A1 | 2/2014 | Okutani et al. |
| 2014/0045020 | A1 | 2/2014 | Okutani et al. |
| 2014/0045021 | A1 | 2/2014 | Okutani et al. |
| 2014/0050976 | A1 | 2/2014 | Nagai |

FOREIGN PATENT DOCUMENTS

| | | |
|---|---|---|
| JP | 3439085 B2 | 8/2003 |
| JP | 2007-180015 A | 7/2007 |
| JP | 2007-227367 A | 9/2007 |
| JP | 2009-129541 A | 6/2009 |
| JP | 2010-108624 A | 5/2010 |
| JP | 2010-531856 A | 9/2010 |
| JP | 2010-287456 A | 12/2010 |
| JP | 2011-070932 A | 4/2011 |
| JP | 2011076785 A | 4/2011 |
| JP | 2011086406 A | 4/2011 |
| JP | 2012-79476 A | 4/2012 |
| JP | 2012084322 A | 4/2012 |
| WO | 2010116533 A | 10/2010 |
| WO | 2010116533 A1 | 10/2010 |
| WO | 2011016112 A1 | 2/2011 |
| WO | 2012/153379 A1 | 11/2012 |

OTHER PUBLICATIONS

Office Action dated Apr. 15, 2015, issued in U.S. Appl. No. 13/962,256. (12 pages).
Office Action dated Jul. 9, 2015, issued in U.S. Appl. No. 13/962,256. (2 pages).
Final Office Action dated Jan. 11, 2016, issued in U.S. Appl. No. 13/961,994 (32 pages).
Office Action dated Jul. 30, 2015, issued in U.S. Appl. No. 13/962,037.
Office Action dated Sep. 3, 2015, issued in U.S. Appl. No. 13/961,994.
Office Action dated Jun. 5, 2015, issued in U.S. Appl. No. 13/962,217.
Office Action dated Oct. 5, 2015, issued in U.S. Appl. No. 13/962,101.
Japanese Office Action dated Nov. 11, 2015 issued in counterpart Japanese Patent Application No. 2012-177258, (3 pages).

* cited by examiner

NONAQUEOUS ELECTROLYTE SECONDARY BATTERY

TECHNICAL FIELD

The present invention relates to a nonaqueous electrolyte secondary battery that has excellent battery characteristics.

BACKGROUND ART

Alkaline secondary batteries typified by nickel-hydrogen batteries and nonaqueous electrolyte secondary batteries typified by lithium ion batteries have been widely used as a power supply for driving portable electronic equipment, such as cell phones including smartphones, portable personal computers, PDAs, and portable music players. In addition, alkaline secondary batteries and nonaqueous electrolyte secondary batteries have been widely used as a power supply for driving electric vehicles (EVs) and hybrid electric vehicles (HEVs and PHEVs), and in stationary storage battery systems for suppressing output fluctuation of solar power generation and wind power generation, for example, and for a peak shift of system power that utilizes the power during the daytime while saving the power during the nighttime.

The use of EVs, HEVs, and PHEVs or the stationary storage battery system especially requires high capacity and high output characteristics. The size of each battery is therefore increased, and a plurality of batteries are connected in series or in parallel for use. Therefore, nonaqueous electrolyte secondary batteries have been generally used for these purposes in view of space efficiency. When physical strength is needed, a metal bottomed prismatic hollow outer can with one side open, and a metal sealing plate for sealing this opening are generally adopted as an outer can of a battery.

Increasing longevity is essential in nonaqueous electrolyte secondary batteries used for the above-mentioned purposes. Therefore, various additives are added to a nonaqueous electrolyte in order to prevent degradation. For example, JP-A-2009-129541 discloses that, in a nonaqueous electrolyte secondary battery, a cyclic phosphazene compound and various salts having an oxalate complex as an anion are added to a nonaqueous electrolyte. JP-T-2010-531856 and JP-A-2010-108624 describe the addition of lithium bis(oxalato)borate $(Li[B(C_2O_4)_2]$, hereinafter referred to as "LiBOB"), which is a lithium salt having an oxalate complex as an anion, as represented by the following structural formula (I).

(I)

For example, Japanese Patent No. 3439085 discloses the invention of a nonaqueous electrolyte secondary battery in which lithium difluorophosphate ($LiPF_2O_2$) is added to a nonaqueous electrolyte in order to prevent self-discharge at charge storage and improve storage characteristics after charging. JP-A-2007-227367 shows an example in which $LiPF_2O_2$ is added to a nonaqueous electrolyte in order to obtain a nonaqueous electrolyte secondary battery having excellent cycling characteristics and low-temperature outputs.

When a cyclic phosphazene compound and various salts having an oxalate complex as an anion disclosed in JP-A-2009-129541 are added, fire resistance of the nonaqueous electrolyte is improved, which can provide a nonaqueous electrolyte secondary battery having excellent battery characteristics and high safety. When LiBOB disclosed in JP-T-2010-531856 and JP-A-2010-108624 is added to a nonaqueous electrolyte, a protective layer including a lithium ion conductive layer that is thin and extremely stable is formed on the surface of a carbon negative electrode active material of the nonaqueous electrolyte secondary battery. This protective layer is stable even in a high temperature, consequently preventing the carbon negative electrode active material from decomposing the nonaqueous electrolyte. This leads to an advantage of providing excellent cycling characteristics and improving the safety of a battery.

In the nonaqueous electrolyte secondary battery disclosed in Japanese Patent No. 3439085, $LiPF_2O_2$ and lithium are reacted in a nonaqueous electrolyte to form a high-quality protective covering onto an interface of a positive electrode active material and a negative electrode active material. This protective covering prevents direct contact between an active material in a state of charge and an organic solvent, thereby preventing decomposition of the nonaqueous electrolyte due to contact between the active material and the nonaqueous electrolyte. Consequently, an advantageous function effect of improving charge storage characteristics can be attained. In the nonaqueous electrolyte secondary battery disclosed in JP-A-2007-227367, a protective covering formed due to the $LiPF_2O_2$ brings preferable cycling characteristics and gives an advantageous effect of obtaining a nonaqueous electrolyte secondary battery that has excellent low temperature characteristics.

In a nonaqueous electrolyte secondary battery using a nonaqueous electrolyte in which a lithium salt having an oxalate complex as an anion is added to a nonaqueous solvent, a problem has been found that, when a battery is in an abnormal condition due to being crushed, for example, and the temperature thereof increased, the reaction is likely to proceed between a negative electrode formed with a protective covering and the nonaqueous electrolyte. This increases the amount of heat generation of the battery. A nonaqueous electrolyte secondary battery requiring high capacity and high output characteristics requires large absolute amounts of a negative electrode mixture and a lithium salt having an oxalate complex as an anion, which are responsible for the heat reaction.

Nonaqueous electrolyte secondary batteries can be used in a low temperature environment since EVs, HEVs, and PHVs are used outside. However, there is a problem in that a low temperature environment increases the viscosity of a nonaqueous electrolyte of the nonaqueous electrolyte secondary battery, thereby lowering output characteristics.

SUMMARY

An advantage of some aspects of the invention is to provide a nonaqueous electrolyte secondary battery that solves the problems regarding heat generation of a battery and regarding a lowering of output characteristics in a low temperature environment.

A nonaqueous electrolyte secondary battery according to an aspect of the invention includes: a flat electrode assembly including a positive electrode and a negative electrode; a bottomed prismatic hollow outer can storing the flat electrode assembly and a nonaqueous electrolyte and having an opening portion; and a sealing plate sealing the opening portion of the hollow outer can. The nonaqueous electrolyte contains at least one of a lithium salt having an oxalate complex as an anion and lithium difluorophosphate ($LiPF_2O_2$) at the time of making the nonaqueous electrolyte secondary battery. The outer surface area of a battery outer body including the hollow outer can and the sealing plate is 350 $cm^2$ or more.

When the lithium salt having the oxalate complex as an anion is contained in the nonaqueous electrolyte, a thin and extremely stable protective layer including a lithium ion conductive layer is formed on the surface of a negative electrode active material of the nonaqueous electrolyte secondary battery. This protective layer is stable even in a high temperature, consequently preventing the negative electrode active material from decomposing the nonaqueous electrolyte, providing excellent cycling characteristics, and improving the safety of a battery. When a temperature of the battery increases, however, the presence of such a protective covering easily promotes a reaction between a negative electrode having the protective covering formed and the nonaqueous electrolyte, and makes the battery more susceptible to generating heat. In the nonaqueous electrolyte secondary battery of the invention, the outer surface area of the battery outer body including the hollow outer can and the sealing plate is 350 $cm^2$ or more. This allows heat generated inside the battery to be easily released outside, thereby preventing an increase in temperature inside the electrode assembly and preventing the reaction between the nonaqueous electrolyte and the negative electrode having the protective covering, which is derived from the lithium salt having the oxalate complex as an anion.

When the outer surface area of the battery outer body including the hollow outer can and the sealing plate is 350 $cm^2$ or more, the external low temperature environment causes the inside of the battery to have a low temperature, and excellent output characteristics is less likely to be obtained. However, use of a nonaqueous electrolyte containing $LiPF_2O_2$ enables a nonaqueous electrolyte secondary battery to be provided that has excellent output characteristics even in a low temperature environment.

It is further preferable that the nonaqueous electrolyte contains a lithium salt having an oxalate complex as an anion and lithium difluorophosphate at the time of making the nonaqueous electrolyte secondary battery. Such a structure provides a nonaqueous electrolyte secondary battery that has excellent cycling characteristics and excellent reliability, and has excellent output characteristics in a low temperature environment. In the nonaqueous electrolyte secondary battery of the invention, it is preferable that the sealing plate have an asperity on the outer surface thereof to have the area of the outer surface thereof larger than that of the bottom surface of the outer can. In such a case, the area of the outer surface of the sealing plate is preferably 1.05 times or more as large as that of the bottom surface of the outer can, more preferably 1.1 times or more.

A compound capable of reversibly absorbing and desorbing lithium ions may be selected to be used as appropriate as the positive electrode active material that can be used in the nonaqueous electrolyte secondary battery of the invention. Such electrode active materials include lithium transition-metal composite oxides that are represented by $LiMO_2$ (M is at least one of Co, Ni, and Mn) and are capable of reversibly absorbing and desorbing lithium ions, namely, $LiCoO_2$, $LiNiO_2$, $LiNi_yCo_{1-y}O_2$ (y=0.01 to 0.99), $LiMnO_2$, $LiCo_xM-n_yNi_zO_2$ (x+y+z=1), $LiMn_2O_4$, or $LiFePo_4$. Such lithium transition-metal composite oxides may be used alone, or two or more of them may be mixed to be used. Furthermore, lithium cobalt composite oxides with different metal element such as zirconium, magnesium, and aluminum added thereto may be used as well.

The following shows examples of a nonaqueous solvent that can be used for the nonaqueous electrolyte in the nonaqueous electrolyte secondary battery of the invention: a cyclic carbonate such as ethylene carbonate (EC), propylene carbonate (PC), and butylene carbonate (BC); a fluorinated cyclic carbonate; a cyclic carboxylic ester such as γ-butyrolactone (γ-BL) and γ-valerolactone (γ-VL); a chain carbonate such as dimethyl carbonate (DMC), ethyl methyl carbonate (EMC), diethyl carbonate (DEC), methylpropyl carbonate (MPC), and dibutyl carbonate (DBC); fluorinated chain carbonate; a chain carboxylic ester such as methyl pivalate, ethyl pivalate, methyl isobutyrate, and methyl propionate; an amide compound such as N,N'-dimethylformamide and N-methyl oxazolidinone; and a sulfur compound such as sulfolane. It is desirable that two or more of them be mixed to be used.

In the nonaqueous electrolyte secondary battery of the invention, the lithium salt that is commonly used as an electrolyte salt for an nonaqueous electrolyte secondary battery may be used as the electrolyte salt dissolved in the nonaqueous solvent. Examples of such a lithium salt are as follows: $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures of these substances. In particular, among them, it is preferable that $LiPF_6$ (lithium hexafluorophosphate) be used. The amount of dissolution of the electrolyte salt with respect to the nonaqueous solvent is preferably from 0.8 to 1.5 mol/L.

In the nonaqueous electrolyte secondary battery of the invention, the lithium salt having the oxalate complex as an anion is preferably contained in the nonaqueous electrolyte in an amount of 0.01 to 2.0 mol/L, more preferably from 0.05 to 0.2 mol/L at the time of making the nonaqueous electrolyte secondary battery. Furthermore, in the nonaqueous electrolyte secondary battery of the invention, $LiPF_2O_2$ is preferably contained in the nonaqueous electrolyte in an amount of 0.01 to 2.0 mol/L, more preferably 0.01 to 0.1 mol/L at the time of making the nonaqueous electrolyte secondary battery. In the nonaqueous electrolyte secondary battery of the invention, the additive amount of the lithium salt having the oxalate complex as an anion or $LiPF_2O_2$ in the nonaqueous electrolyte may be added as the electrolyte salt whose principal element is the lithium salt having the oxalate complex as an anion or $LiPF_2O_2$. However, a large additive amount of the lithium salt having the oxalate complex as an anion or $LiPF_2O_2$ in the nonaqueous electrolyte increases the viscosity of the nonaqueous electrolyte. Therefore, various electrolyte salts as above may be used as principal elements, and the lithium salt having the oxalate complex as an anion or $LiPF_2O_2$ may be added as an additive substance in a small amount, for example, about 0.1 mol/L. When the lithium salt having the oxalate complex as an anion or $LiPF_2O_2$ is added as the additive substance, depending on the additive amount thereof, all of the lithium salt having the oxalate complex as an anion or $LiPF_2O_2$ is consumed for forming the protective covering on the positive electrode or negative electrode at the initial charge. This might lead to a case in which no lithium salt having the oxalate complex as an anion or $LiPF_2O_2$ is substantially in the nonaqueous electrolyte. The invention also includes this case. Thus, the invention includes any case in which the nonaqueous electrolyte of the nonaqueous electrolyte secondary battery before the initial charge contains the lithium salt having the oxalate complex as an anion or $LiPF_2O_2$.

In the nonaqueous electrolyte secondary battery of the invention, it is preferable that the hollow outer can be made using pure aluminum.

The hollow outer can made using pure aluminum is adopted since pure aluminum has higher heat conductivity than aluminum alloy. This provides excellent heat release characteristics when the battery is in an abnormal condition due to being crushed, for example, and then heat is generated inside the battery. JIS-A1000 series (JIS-A1050, JIS-A1100, JIS-A1070, and JIS-A1085, for example) is preferably used as pure aluminum.

In the nonaqueous electrolyte secondary battery of the invention, it is preferable that the sealing plate be made using aluminum alloy.

The sealing plate made using aluminum alloy is adopted since aluminum alloy has lower heat conductivity than pure aluminum but has high strength. Therefore, a particular strength is ensured even if the thickness of the sealing plate is small, thereby increasing the efficient inner volume of the battery and consequently increasing the battery capacity. JIS-A3003 and JIS-A3004, for example, are preferably used as aluminum alloy.

In the nonaqueous electrolyte secondary battery of the invention, it is preferable that the positive electrode and the negative electrode each have an elongated shape, that the flat electrode assembly be formed by winding the elongated positive electrode and the elongated negative electrode with an elongated separator interposed therebetween, that the flat electrode assembly include a positive electrode substrate exposed portion wound on one end and a negative electrode substrate exposed portion wound on the other end, that the wound positive electrode substrate exposed portion have both outermost sides thereof connected to a positive electrode collector, and that the wound negative electrode substrate exposed portion have both outermost sides thereof connected to a negative electrode collector.

Such a structure allows heat generated inside the electrode assembly to be easily released outside the electrode assembly through the wound substrate exposed portion and prevents an increase in temperature inside the electrode assembly. The heat generated inside the electrode assembly is also conducted to the collector connected to both outermost surfaces of the wound substrate exposed portion, thereby preventing the increase in temperature inside the electrode assembly.

In the nonaqueous electrolyte secondary battery of the invention, it is preferable that a negative electrode substrate exposed portion be formed on both ends of the negative electrode in a width direction along a longitudinal direction. In such a case, it is preferable that one of the negative electrode substrate exposed portions be wider than the other, and the wider substrate exposed portion be connected to the negative electrode collector.

Such a structure enables heat to be released from both ends of the negative electrode substrate exposed portions in the width direction, thereby further improving heat release from the negative electrode.

In the nonaqueous electrolyte secondary battery of the invention, it is preferable that a positive electrode collector have a rib formed in a region facing a positive electrode substrate exposed portion and on an end on the center side of the flat winding electrode assembly, and that a negative electrode collector have a rib formed in a region facing a negative electrode substrate exposed portion and on an end on the center side of the flat winding electrode assembly.

Such a structure allows the rib to prevent scatter of spatters generated when the collector is welded to the outermost surface of a stack of a plurality of layers of the positive electrode substrate exposed portion or a stack of a plurality layers of the negative electrode substrate exposed portion. Therefore, these spatters are less likely to enter the inside of the flat winding electrode assembly, whereby a nonaqueous electrolyte secondary battery can be obtained that has excellent reliability. In addition, high heat is generated when the positive electrode collector or the negative electrode collector is welded to the positive electrode substrate exposed portion or the negative electrode substrate exposed portion. However, the rib serves as a heat releasing fin, which prevents a portion other than the resistance-welded portion of the positive electrode collector and the negative electrode collector to be melted.

In the nonaqueous electrolyte secondary battery of the invention, it is preferable that the area of a negative electrode substrate exposed portion be 700 cm$^2$ or more, that the area of a positive electrode substrate exposed portion be 500 cm$^2$ or more, and that the area of the negative electrode substrate exposed portion be larger than that of the positive electrode substrate exposed portion.

The areas of the negative electrode substrate exposed portion and the positive electrode substrate exposed portion are 700 cm$^2$ or more and 500 cm$^2$ or more, respectively. This allows heat generated inside the electrode assembly to be easily released outside the electrode assembly and prevents an increase in temperature inside the electrode assembly. In addition, the area of the negative electrode substrate exposed portion is larger than that of the positive electrode substrate exposed portion. This prevents an increase in temperature of the negative electrode more efficiently and prevents a reaction between the negative electrode having the protective covering formed and the nonaqueous electrolyte.

In the nonaqueous electrolyte secondary battery of the invention, it is preferable that the lithium salt having the oxalate complex as an anion be lithium bis(oxalato)borate ($Li[B(C_2O_4)_2]$, hereinafter referred to as "LiBOB").

Using LiBOB as the lithium salt having the oxalate complex as an anion provides the nonaqueous electrolyte secondary battery capable of attaining further preferable cycling characteristics. LiBOB is preferably contained in an amount of 0.01 to 2.0 mol/L, more preferably 0.05 to 0.2 mol/L, at the time of making the nonaqueous electrolyte secondary battery.

BRIEF DESCRIPTION OF THE DRAWINGS

The invention will be described with reference to the accompanying drawings, wherein like numbers reference like elements.

DESCRIPTION OF EXEMPLARY EMBODIMENTS

Various embodiments of the invention will be described below in detail with reference to the accompanying drawings. However, the embodiments described below are merely illustrative examples for understanding the technical spirit of the invention and are not intended to limit the invention to the embodiments. The invention may be equally applied to various modifications without departing from the technical spirit described in the claims A flat electrode assembly to be used in the invention may be applied to a flat electrode assembly that has a plurality of layers of a positive electrode substrate exposed portion formed on one end and a plurality of layers of a negative electrode substrate exposed portion formed on the other end by stacking or winding a positive electrode and a negative electrode with a separator interposed therebetween. The following will describe an example of a flat winding electrode assembly.

Embodiments 1 and 2

First, a prismatic nonaqueous electrolyte secondary battery common to Embodiments 1 and 2 will be described with reference to FIGS. 1 to 4. As shown in FIG. 4, this nonaqueous electrolyte secondary battery 10 includes a flat winding electrode assembly 14. In the electrode assembly 14, a positive electrode 11 and a negative electrode 12 are wound while being insulated from each other with a separator 13 interposed therebetween. The winding electrode assembly 14 has its outermost side covered with the separator 13 and has the negative electrode 12 disposed on a further outer side than the positive electrode 11.

Figure 3A:
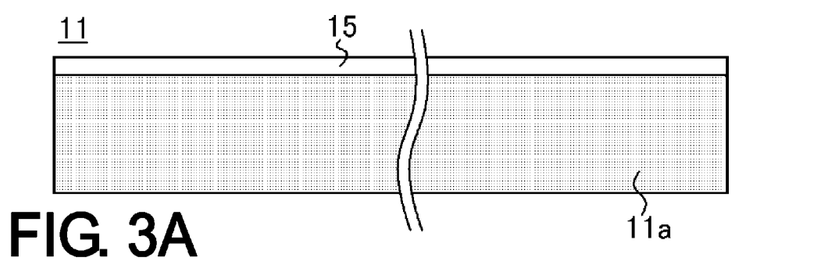
FIG. 3A is a plan view of a positive electrode used in the prismatic nonaqueous electrolyte secondary battery common to each embodiment.

As illustrated in FIG. 3A, a positive electrode 11 is produced by the following process: a positive electrode active material mixture is applied onto both sides of a positive electrode substrate of aluminum foil; the resultant object is dried and extended by applying pressure; and the positive electrode 11 is slit so as to expose the aluminum foil in a strip along the end of one side in the wide direction. The part of the aluminum foil exposed in a strip is a positive electrode substrate exposed portion 15. As illustrate in FIG. 3B, a negative electrode 12 is produced by the following process: a negative electrode active material mixture is applied onto both sides of a negative electrode substrate of copper foil; the resultant object is dried and extended by applying pressure; and the negative electrode 12 is slit so as to expose the copper foil in a strip along the end of one side in the wide direction. The part of the copper foil exposed in a strip is a negative electrode substrate exposed portion 16.

Figure 3B:
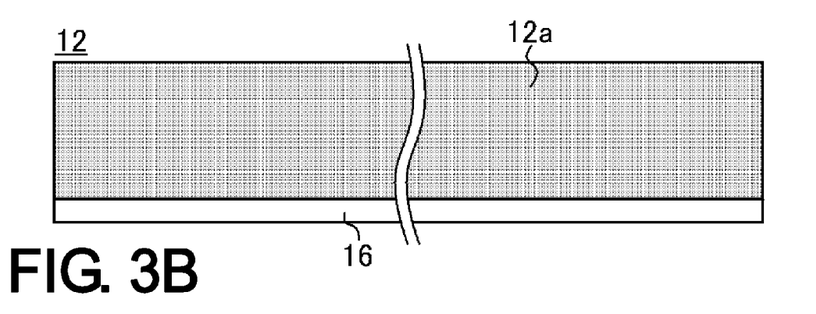
FIG. 3B is a plan view of a negative electrode thereof.
Figure 4:
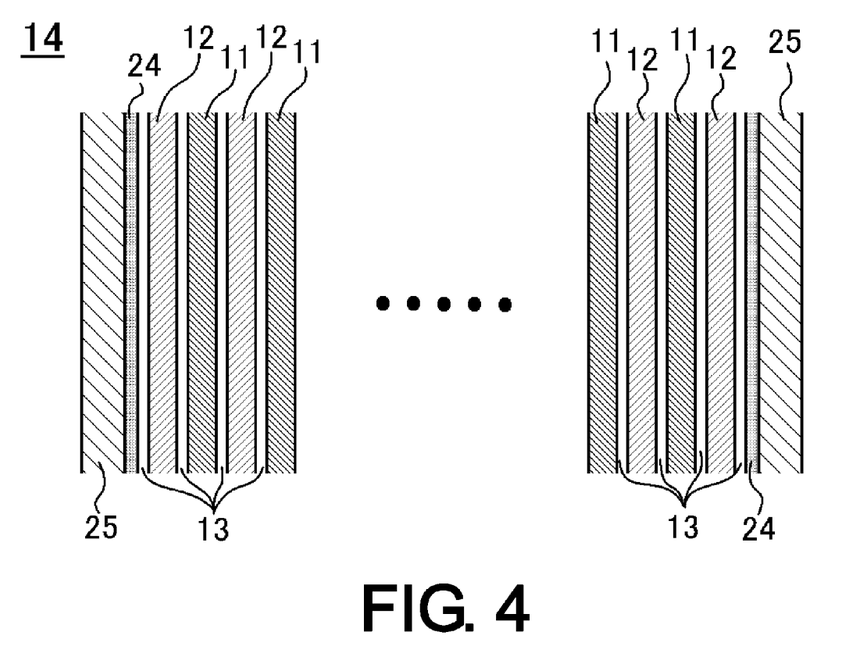
FIG. 4 is a fragmentary enlarged sectional view along line IV-IV of FIG. 2B.

The width and length of a negative electrode active material mixture layer 12a of the negative electrode 12 are larger than those of a positive electrode active material mixture layer 11a. It is preferable that the positive electrode substrate be formed using foil of aluminum or aluminum alloy having a thickness of about from 10 to 20 μm, while the negative electrode substrate be formed using foil of copper or copper alloy having a thickness of about from 5 to 15 μm. A specific composition of the positive electrode active material mixture layer 11a and the negative electrode active material mixture layer 12a will be described later.

Figure 2A:
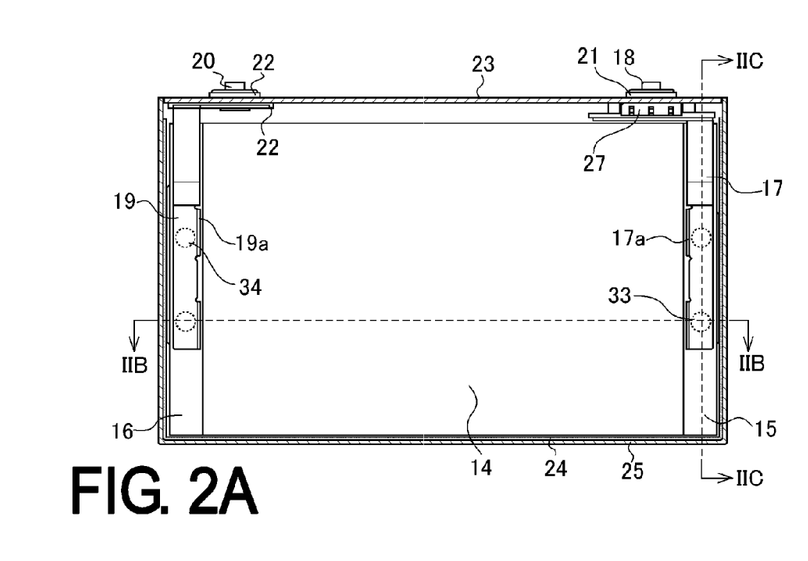
FIG. 2A is a fragmentary sectional view along line IIA-IIA of FIG. 1A.
Figure 2B:
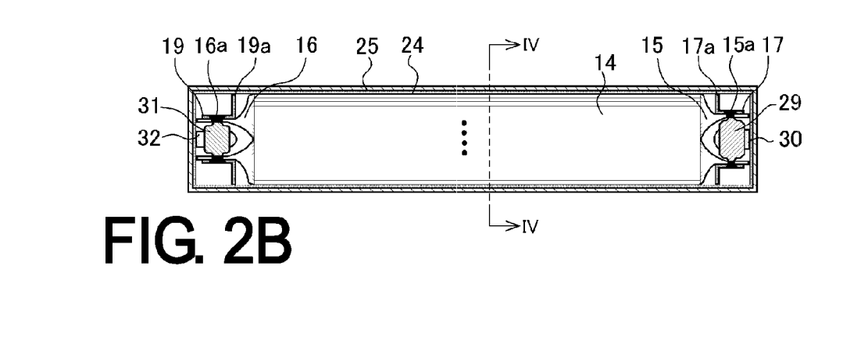
FIG. 2B is a fragmentary sectional view along line IIB-IIB of FIG. 2A.

As shown in FIGS. 2A and 2B, the flat winding electrode assembly 14 having a plurality of stacked layers of the positive electrode substrate exposed portion 15 on one end and a plurality of stacked layers of the negative electrode substrate exposed portion 16 on the other end is produced by the following process: the positive electrode 11 and the negative electrode 12 produced as above are displaced so that the aluminum foil exposed portion of the positive electrode 11 and the copper foil exposed portion of the negative electrode 12 are not overlapped by the active material mixture layers of the opposing electrodes; and the positive electrode 11 and the negative electrode 12 are wound while being insulated from each other with a separator 13 interposed therebetween. A microporous polyolefin membrane is preferably used as the separator 13.

Figure 1A:
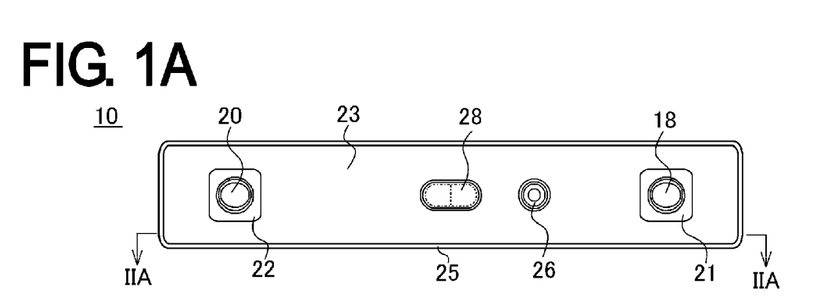
FIG. 1A is a plan view of a prismatic nonaqueous electrolyte secondary battery common to each embodiment.
Figure 1B:
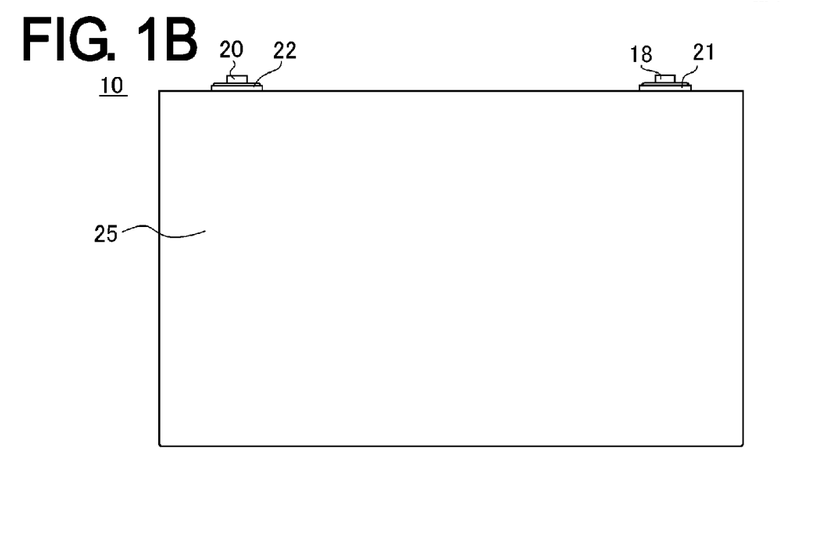
FIG. 1B is a front view thereof.

The stacked layers of the positive electrode substrate exposed portion 15 are electrically connected to a positive electrode terminal 18 of aluminum material with a positive electrode collector 17 of aluminum material interposed therebetween. Likewise, the stacked layers of the negative electrode substrate exposed portion 16 are electrically connected to a negative electrode terminal 20 of copper material with a negative electrode collector 19 of copper material interposed therebetween. As shown in FIGS. 1A, 1B, and 2A, the positive electrode terminal 18 and the negative electrode terminal 20 are fixed to a sealing plate 23 of aluminum material or other material with insulating members 21 and 22, respectively, interposed therebetween. Where appropriate, the positive electrode terminal 18 and the negative electrode terminal 20 are connected to an external positive electrode terminal and an external negative electrode terminal (neither shown in the drawings), respectively.

As described above, the flat winding electrode assembly 14 is formed by attaching the positive electrode collector 17 and the negative electrode collector 19 to the positive electrode terminal 18 and the negative electrode terminal 20 that are provided to the sealing plate 23, respectively. The flat winding electrode assembly 14 is inserted into an insulating sheet 24. The insulating sheet 24 of polypropylene, for example, is assembled in a box-shape so that the mouth is positioned on the sealing plate 23 side. Thus, the flat winding electrode assembly 14 other than the sealing plate 23 side is covered with the insulating sheet 24, and the flat winding electrode assembly 14 together with this insulating sheet 24 is inserted into a hollow outer can 25 of pure aluminum (JIS A1000) having one side thereof open. The sealing plate 23 is then fitted to the opening portion of the hollow outer can 25, and a fitting portion between the sealing plate 23 and the hollow outer can 25 is laser-welded. Moreover, a nonaqueous electrolyte is poured through an electrolyte pour hole 26, and then the electrolyte pour hole 26 is sealed. Consequently, the nonaqueous electrolyte secondary battery 10 of Embodiments 1 and 2 is produced. In the prismatic nonaqueous electrolyte secondary battery 10 of Embodiments 1 and 2, as shown in FIG. 4, starting from the hollow outer can 25, the insulating sheet 24, the separator 13, the negative electrode 12, the separator 13, the positive electrode 11, the separator 13, the negative electrode 12, . . . are disposed.

A current interruption mechanism 27 operated by a gas pressure generated inside the battery is provided between the positive electrode collector 17 and the positive electrode terminal 18. A gas exhaust valve 28 that is open when a gas pressure higher than the working pressure of the current interruption mechanism 27 is applied is also provided on the sealing plate 23. Therefore, the inside of the nonaqueous electrolyte secondary battery 10 is sealed. The nonaqueous electrolyte secondary battery 10 alone may be used, or a plurality of nonaqueous electrolyte secondary batteries 10 connected in series or in parallel may be used for various purposes. When a plurality of nonaqueous electrolyte secondary batteries 10 connected in series or in parallel are used, the external positive electrode terminal and the external negative electrode terminal may be provided separately to connect the respective batteries with a bus bar.

The flat winding electrode assembly 14 used in the prismatic nonaqueous electrolyte secondary battery 10 of Embodiments 1 and 2 is used when high capacity of 20 Ah or more and high output characteristics are required. For example, the winding number of the positive electrode 11 is 43, in other words, the total number of stacked layers of the positive electrode 11 is 86. When the winding number is 30 or more, in other words, the total number of stacked layers is 60 or more, the capacity of the battery can be 20 Ah or more without increasing the size of the battery beyond necessity.

When the total number of stacked layers of the positive electrode substrate exposed portion 15 or the negative electrode substrate exposed portion 16 is large, a large amount of welding current is needed to form a weld mark 15a or 16a passing through the whole stacked layer portions of the stacked positive electrode substrate exposed portion 15 or the negative electrode substrate exposed portion 16 in resistance-welding the positive electrode collector 17 and the negative electrode collector 19 to the positive electrode substrate exposed portion 15 and the negative electrode substrate exposed portion 16, respectively.

Figure 2C:
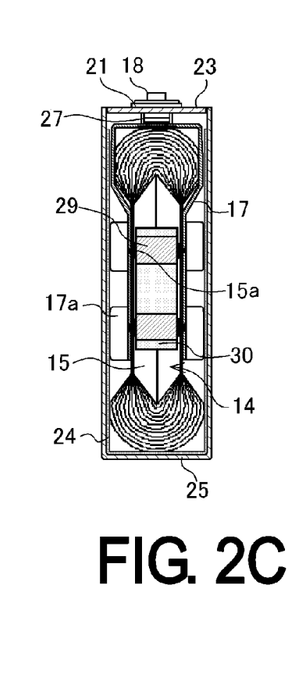
FIG. 2C is a sectional view along line IIC-IIC of FIG. 2A.

As shown in FIGS. 2A to 2C, in the positive electrode 11, the stacked positive electrode substrate exposed portion 15 is divided into two segments, and a positive electrode intermediate member 30 is interposed therebetween. The positive electrode intermediate member 30 is formed using a resin member and holds a plurality of positive electrode conductive members 29, here, two positive electrode conductive members 29. Likewise, in the negative electrode 12, the stacked positive electrode substrate exposed portion 16 is divided into two segments, and a negative electrode intermediate member 32 is interposed therebetween. The negative electrode intermediate member 32 is formed using a resin member and holds a plurality of negative electrode conductive members 31, here, two negative electrode conductive members 31. The positive electrode collector 17 is disposed on the surfaces of both sides of the outermost side of the two segments of the positive electrode substrate exposed portion 15 that are disposed on both sides of the positive electrode conductive members 29. The negative electrode collector 19 is disposed on the surfaces of both sides of the outermost side of the two segments of the negative electrode substrate exposed portion 16 that are disposed on both sides of the negative electrode conductive members 31. The positive electrode conductive members 29 are made of aluminum material as with the positive electrode substrate, and the negative electrode conductive members 31 are made of copper material as with the negative electrode substrate. The shape of the positive electrode conductive members 29 and the negative electrode conductive members 31 may be either the same or different.

When the positive electrode substrate exposed portion 15 or the negative electrode substrate exposed portion 16 is divided into two segments, welding current needed to form a weld mark 15a or 16a passing through the whole stacked layer portion of the stacked positive electrode substrate exposed portion 15 or the negative electrode substrate exposed portion 16 is small compared to a case in which there is no division. This prevents sputters during resistance welding, thereby preventing a trouble such as an internal short in the winding electrode assembly 14 due to the sputters. Thus, the resistance welding is performed between the positive electrode collector 17 and the positive electrode substrate exposed portion 15 and between the positive electrode substrate exposed portion 15 and the positive electrode conductive members 29. Resistance welding is also performed between the negative electrode collector 19 and the negative electrode substrate exposed portion 16 and between the negative electrode substrate exposed portion 16 and the negative electrode conductive members 31. FIG. 2 shows two weld marks 33 formed by resistance-welding in the positive electrode collector 17 and two weld marks 34 formed by resistance-welding in the negative electrode collector 19.

The resistance-welding methods with the positive electrode intermediate member 30 including the positive electrode substrate exposed portion 15, the positive electrode collector 17, and the positive electrode conductive members 29, and with the negative electrode intermediate member 32 including the negative electrode substrate exposed portion 16, the negative electrode collector 19, and the negative electrode conductive members 31 in the flat winding electrode assembly 14 of Embodiments 1 and 2 will be described in detail below. In Embodiments 1 and 2, the shapes of the positive electrode conductive members 29 and the negative electrode conductive members 31 may be substantially the same, and the shapes of the positive electrode intermediate member 30 and the negative electrode intermediate member 32 may be substantially the same. The resistance-welding methods are substantially the same as well. Therefore, the positive electrode 11 will be described below as an example.

The positive electrode substrate exposed portion 15 of the flat winding electrode assembly 14 produced as above is divided into two segments from the winding central part to both sides and is collected centering on a quarter of the thickness of the electrode assembly. Subsequently, the positive electrode collector 17 is provided on both surfaces on the outermost periphery side of the positive electrode substrate exposed portion 15. On the inner periphery side of the positive electrode substrate exposed portion 15, the positive electrode intermediate member 30 including the positive electrode conductive members 29 is inserted between the two segments of the positive electrode substrate exposed portion 15 so that respective projections on both sides of the positive electrode conductive members 29 are brought into contact with the positive electrode substrate exposed portion 15. For example, the positive electrode collector 17 is made of an aluminum plate that has a thickness of 0.8 mm.

The positive electrode conductive members 29 held by the positive electrode intermediate member 30 of Embodiments 1 and 2 have projections that have, for example, a shape of a circular truncated cone and are formed on two surfaces facing each other on the cylindrical main body. As long as the positive electrode conductive members 29 are made of metal and blockish, any shape such as a cylinder, a prism, and an elliptic cylinder may be adopted. Materials made of copper, copper alloy, aluminum, aluminum alloy, tungsten, molybdenum, etc., may be used as a formation material of the positive electrode conductive members 29. Among the materials made of these metals, the following configurations may be adopted: the projection on which nickel plate is applied; and the projection and its base area formed of metal material that facilitates heat generation such as tungsten and molybdenum and, for example, brazed to the main body of the cylindrical positive electrode conductive members 29 made of copper, copper alloy, aluminum or aluminum alloy.

A plurality of, for example, here two pieces of positive electrode conductive members 29 are integrally held by the positive electrode intermediate member 30. In such a case, the respective electrode conductive members 29 are held so as to be in parallel with each other. The positive electrode intermediate member 30 may have any shape such as a prism and cylinder. However, a landscape prism is desirable in order that the positive electrode intermediate member 30 is stably positioned and fixed between the two segments of the positive electrode substrate exposed portion 15. It is preferable that the corners of the positive electrode intermediate member 30 be chamfered in order not to hurt or deform the soft positive electrode substrate exposed portion 15 even if contacting the positive electrode substrate exposed portion 15. At least a part to be inserted between the two segments of the positive electrode substrate exposed portion 15 may be chamfered.

The length of the prismatic positive electrode intermediate member 30 varies depending on the size of the prismatic nonaqueous electrolyte secondary battery 10, but it may be from 20 mm to tens of mm. The width of the prismatic positive electrode intermediate member 30 may be as much as the height of the positive electrode conductive members 29, but at least both ends of the positive electrode conductive members 29 as welded portions may be exposed. It is preferable that both ends of the positive electrode conductive members 29 protrude from the surface of the positive electrode intermediate member 30, but the positive electrode conductive members 29 do not necessarily protrude. Such a structure enables the positive electrode conductive members 29 to be held in the positive electrode intermediate member 30, and the positive electrode intermediate member 30 to be stably positioned and disposed between the two segments of the positive electrode substrate exposed portion 15.

Subsequently, the flat winding electrode assembly 14, which includes the positive electrode collector 17 and the positive electrode intermediate member 30 holding the positive electrode conductive members 29 disposed therein, is arranged between a pair of resistance welding electrodes (not shown in the drawings). The pair of resistance welding electrodes are each brought into contact with the positive electrode collector 17 disposed on both surfaces of the outermost periphery side of the positive electrode substrate exposed portion 15. An appropriate pressure is then applied between the pair of resistance welding electrodes, thereby performing the resistance welding under predetermined certain conditions. In this resistance welding, the positive electrode intermediate member 30 is stably positioned and disposed between the two segments of the positive electrode substrate exposed portion 15, which improves the dimensional accuracy between the positive electrode conductive members 29 and the pair of resistance welding electrodes, enables the resistance welding to be performed in an accurate and stable state, and curbs variation in the welding strength.

Next, the detailed structure of the positive electrode collector 17 and the negative electrode collector 19 of Embodiments 1 and 2 will be described with reference to FIG. 2. As shown in FIGS. 2A and 2B, the positive electrode collector 17 is electrically connected to a plurality of layers of the positive electrode substrate exposed portion 15 stacked on one side edge of the flat winding electrode assembly 14 by the resistance welding method. The positive electrode collector 17 is electrically connected to the positive electrode terminal 18. Likewise, the negative electrode collector 19 is electrically connected to a plurality of layers of the negative electrode substrate exposed portion 16 stacked on the other side edge of the flat winding electrode assembly 14 by the resistance welding method. The negative electrode collector 19 is electrically connected to the negative electrode terminal 20.

The positive electrode collector 17 is produced, for example, by punching out an aluminum plate in a particular shape and bending it. This positive electrode collector 17 has a rib 17a formed on a main body part where resistance welding is performed to a bundle of the positive electrode substrate exposed portion 15, in a region facing the positive electrode substrate exposed portion 15, and on the end on the center side of the flat winding electrode assembly 14. The negative electrode collector 19 is produced, for example, by punching out a copper plate in a particular shape and bending it. This negative electrode collector 19 also has a rib 19a formed on the main body part where the resistance welding is performed to a bundle of the negative electrode substrate exposed portion 16, in a region facing the negative electrode substrate exposed portion 16, and on the end on the center side of the flat winding electrode assembly 14.

The rib 17a of the positive electrode collector 17 and the rib 19a of the negative electrode collector 19 serve as a shield in order to prevent sputters generated during the resistance welding from entering the inside of the flat winding electrode assembly 14, and as a radiation fin in order to prevent a portion other than the resistance welded portion of the positive electrode collector 17 and the negative electrode collector 19 from being melted by heat generated during the resistance welding. The ribs 17a and 19a are provided at a right angle from the main body of the positive electrode collector 17 and the negative electrode collector 19, respectively, but the angle need not necessarily be vertical. Even a tilt of about ±10° from the right angle brings the same function effect.

In the prismatic nonaqueous electrolyte secondary battery 10 of Embodiments 1 and 2, the example shows that two ribs are provided corresponding to the resistance welding position along the longitudinal direction as the rib 17a of the positive electrode collector 17 and the rib 19a of the negative electrode collector 19. However, the configuration is not limited to this case. One rib may be provided, or ribs may be formed on both sides in the width direction. When ribs are formed on both sides in the width direction, their heights may be either the same or different. If their heights are different, it is preferable that the rib around the flat winding electrode assembly 14 be provided at a higher position than the other.

Preparation of Positive Electrode

The following describes a specific composition of the positive electrode active material mixture layer 11a and the negative electrode active material mixture layer 12a and a specific composition of the nonaqueous electrolyte used in the prismatic nonaqueous electrolyte secondary battery 10 common to Embodiments 1 and 2. Lithium nickel cobalt manganese composite oxide represented by $LiNi_{0.35}Co_{0.35}Mn_{0.30}O_2$ was used as the positive electrode active material. This lithium nickel cobalt manganese composite oxide, carbon powder as a conductive agent, and polyvinylidene fluoride (PVdF) as a binding agent were weighed so that the mass ratio would be 88:9:3, and were mixed with N-methyl-2-pyrrolidone (NMP) as dispersion media to produce a positive electrode active material mixture slurry. This positive electrode active material mixture slurry was applied with a die coater onto both sides of the positive electrode substrate of aluminum foil whose thickness was, for example, 15 μm to form the positive electrode active material mixture layer onto both sides of the positive electrode substrate. Next, the resultant object was dried to remove NMP as an organic solvent, and was pressed with a roll press to have a particular thickness. The electrode thus obtained was slit in a particular width on one end of the electrode in the width direction along the whole longitudinal direction to form the positive electrode substrate exposed portion 15 that had no positive electrode active material mixture layer formed onto both sides, and whereby the positive electrode 11 of the structure shown in FIG. 3A was obtained.

Preparation of Negative Electrode

The negative electrode common to Embodiments 1 and 2 was produced as follows: 98 parts by mass of graphite powder, 1 part by mass of carboxymethylcellulose (CMC) as a thickening agent, and 1 part by mass of styrene-butadiene-rubber (SBR) as a binding agent were dispersed in water to produce a negative electrode active material mixture slurry. This negative electrode active material mixture slurry was applied with a die coater onto both sides of the negative electrode collector of copper foil whose thickness was 10 μm, and was dried to form the negative electrode active material mixture layer onto both sides of the negative electrode collector. Next, the resultant object was pressed with a press roller to have a particular thickness. The electrode plate thus obtained was slit in a particular width on one end of the electrode in the width direction along the whole longitudinal direction to form the negative electrode substrate exposed portion 16 that had no negative electrode active material mixture layer formed onto both sides, and whereby the negative electrode 12 of the structure shown in FIG. 3B was obtained.

Preparation of Nonaqueous Electrolyte of Embodiment 1

The nonaqueous electrolyte to be used in the nonaqueous electrolyte secondary battery of Embodiment 1 was produced as follows: as a solvent, ethylene carbonate (EC) and methyl ethyl carbonate (MEC) were mixed with a volume ratio (25° C. and 1 atmosphere) of 3:7; $LiPF_6$ as an electrolyte salt was added to the mixed solvent so that the concentration would be 1 mol/L; and then LiBOB as a lithium salt having an oxalate complex as an anion was further added so that the concentrations would be 0.1 mol/L. The added LiBOB is reacted on the surface of the negative electrode at the initial charge to form a protective covering. Therefore, in the prismatic nonaqueous electrolyte secondary battery 10 of Embodiment 1, all LiBOB added to the nonaqueous electrolyte is not necessarily present in the form of LiBOB.

Preparation of Nonaqueous Electrolyte of Embodiment 2

The nonaqueous electrolyte to be used in the nonaqueous electrolyte secondary battery of Embodiment 2 was produced as follows: as a solvent, ethylene carbonate (EC) and methyl ethyl carbonate (MEC) were mixed with a volume ratio (25° C. and 1 atmosphere) of 3:7; $LiPF_6$ as an electrolyte salt was added to the mixed solvent so that the concentration would be 1 mol/L; and then $LiPF_2O_2$ was further added so that the concentration would be 0.05 mol/L. $LiPF_2O_2$ causes a protective covering to be formed on the surface of the positive electrode and the negative electrode at the initial charge and discharge. Therefore, in the prismatic nonaqueous electrolyte secondary battery 10 of Embodiment 2, all $LiPF_2O_2$ added to the nonaqueous electrolyte is not necessarily present in the form of $LiPF_2O_2$.

Production of Prismatic Nonaqueous Electrolyte Secondary Battery

Figure 5:
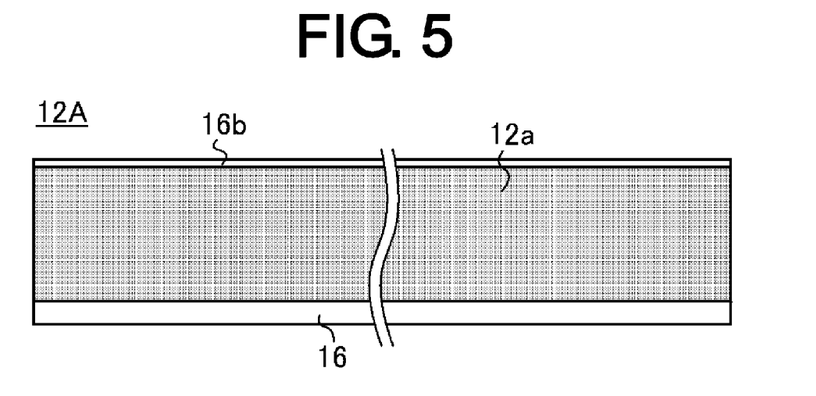
FIG. 5 is a plan view of a negative electrode used in a prismatic nonaqueous electrolyte secondary battery in accordance with a first modification.

The negative electrode 12 and the positive electrode 11 produced as above were wound while being insulated from each other with the separator 13 interposed therebetween so as to dispose the negative electrode 12 onto the outermost periphery side. Subsequently, the resultant object was formed to be flat, and whereby the flat winding electrode assembly 14 was produced. The negative electrode 12 on the outermost side has the surface thereof covered with the separator 13. In the flat winding electrode assembly 14, the winding numbers of the positive electrode 11 and the negative electrode 12 were 43 and 44, respectively, in other words, the numbers of stacked layers of the positive electrode 11 and the negative electrode 12 were 86 and 88, respectively, and the design capacity was 20 Ah. Furthermore, the total numbers of stacked layers of the positive electrode substrate exposed portion 15 and the negative electrode substrate exposed portion 16 were 86 and 88, respectively. As shown in FIGS. 1, 2, and 5, this flat winding electrode assembly 14 was used, and a positive electrode collector 17 and a negative electrode collector 19 were welded and connected to the positive electrode substrate exposed portion 15 and the negative electrode substrate exposed portion 16, respectively, by resistance-welding. It is preferable that the positive electrode collector 17 be electrically connected in advance to a positive electrode terminal 18 with a current interruption mechanism 27 interposed therebetween and that the positive electrode collector 17, the current interruption mechanism 27, and the positive electrode terminal 18 be attached to the sealing plate 23 in a state of being electrically insulated from each other, before connecting the positive and negative electrode collectors to the positive and negative electrode substrate exposed portions. In addition, it is preferable that the negative electrode collector 19 be electrically connected in advance to a negative electrode terminal 20 and that the negative electrode collector 19 and the negative electrode terminal 20 be attached to the sealing plate 23 in a state of being electrically insulated from each other.

As described above, the flat winding electrode assembly 14 was formed by attaching the positive electrode collector 17 and the negative electrode collector 19 to the positive electrode terminal 18 and the negative electrode terminal 20 that were provided to the sealing plate 23, respectively. The flat winding electrode assembly 14 was inserted into an insulating sheet 24. The insulating sheet 24, for example, having a thickness of 0.2 mm and made using polypropylene, was assembled in a box shape so that the mouth was positioned on the sealing plate 23 side. Consequently, the flat winding electrode assembly 14 other than the sealing plate 23 side was covered with an insulating sheet 24. Next, the flat winding electrode assembly 14 covered with this insulating sheet 24 was inserted into a hollow outer can 25 of pure aluminum (JIS A1000) having one side thereof open. Subsequently, the sealing plate 23 was fitted to the opening portion of the hollow outer can 25, and a fitting portion between the sealing plate 23 and the hollow outer can 25 was laser-welded. Next, the above-mentioned nonaqueous electrolyte was poured, thereby producing the prismatic nonaqueous electrolyte secondary battery of Embodiments 1 and 2 having a structure described in FIGS. 1 and 2.

The produced prismatic nonaqueous electrolyte secondary battery of Embodiments 1 and 2 has a size of a width of 2.6 cm×a length of 15 cm×a height of 9.1 cm. The outer surface area of a battery outer body including the hollow outer can 25 and the sealing plate 23 is approximately 400 $cm^2$.

The prismatic nonaqueous electrolyte secondary battery of Embodiment 1 can provide a nonaqueous electrolyte secondary battery that has excellent cycling characteristics and excellent reliability. The prismatic nonaqueous electrolyte secondary battery of Embodiment 2 can provide a nonaqueous electrolyte secondary battery that has excellent output characteristics in a low temperature environment.

First Modification

As a first modification, the following describes an example in which the negative electrode 12 has a larger area and an additional negative electrode substrate exposed portion is formed in accordance with the enlarged area with reference to FIG. 5.

A negative electrode 12A of the first modification not only has a larger area than the negative electrode 12 of the embodiments, but also has another negative electrode substrate exposed portion 16b formed in a particular width along a longitudinal direction at the opposite side where the negative electrode substrate exposed portion 16 is formed in the lateral direction. This allows an area of a part where a negative electrode active material mixture layer 12a of the negative electrode 12A is formed to be the same as that of a part where the negative electrode active material mixture layer 12a of the negative electrode 12 is formed in the embodiments, and also enlarges the area of the negative electrode 12 for an additionally created negative electrode substrate exposed portion 16b. The positive electrode 11 is used that has the same size and the same structure as the positive electrode 11 of the embodiments shown in FIG. 3A.

Using the negative electrode 12A in such a structure can prevent an internal short between the positive electrode and the negative electrode and can enlarge the area of the negative electrode since the separator 13 is arranged along with both sides of the additionally formed negative electrode substrate exposed portion 16b on the negative electrode 12A. This improves the heat release efficiency of the negative electrode.

Second Modification

The nonaqueous electrolyte secondary battery 10 of the embodiments shows an example in which the stacked layers of the positive electrode substrate exposed portion 15 and the stacked layers of the negative electrode substrate exposed portion 16 are divided into two segments to interpose therebetween the positive electrode intermediate member 30 including the positive electrode conductive member 29 and the negative electrode intermediate member 32 including the negative electrode conductive member 31, respectively. However, in the invention, it is not necessary to divide the stacked layers of the positive electrode substrate exposed portion 15 or the stacked layers of the negative electrode substrate exposed portion 16 into two segments.

Figure 6A:
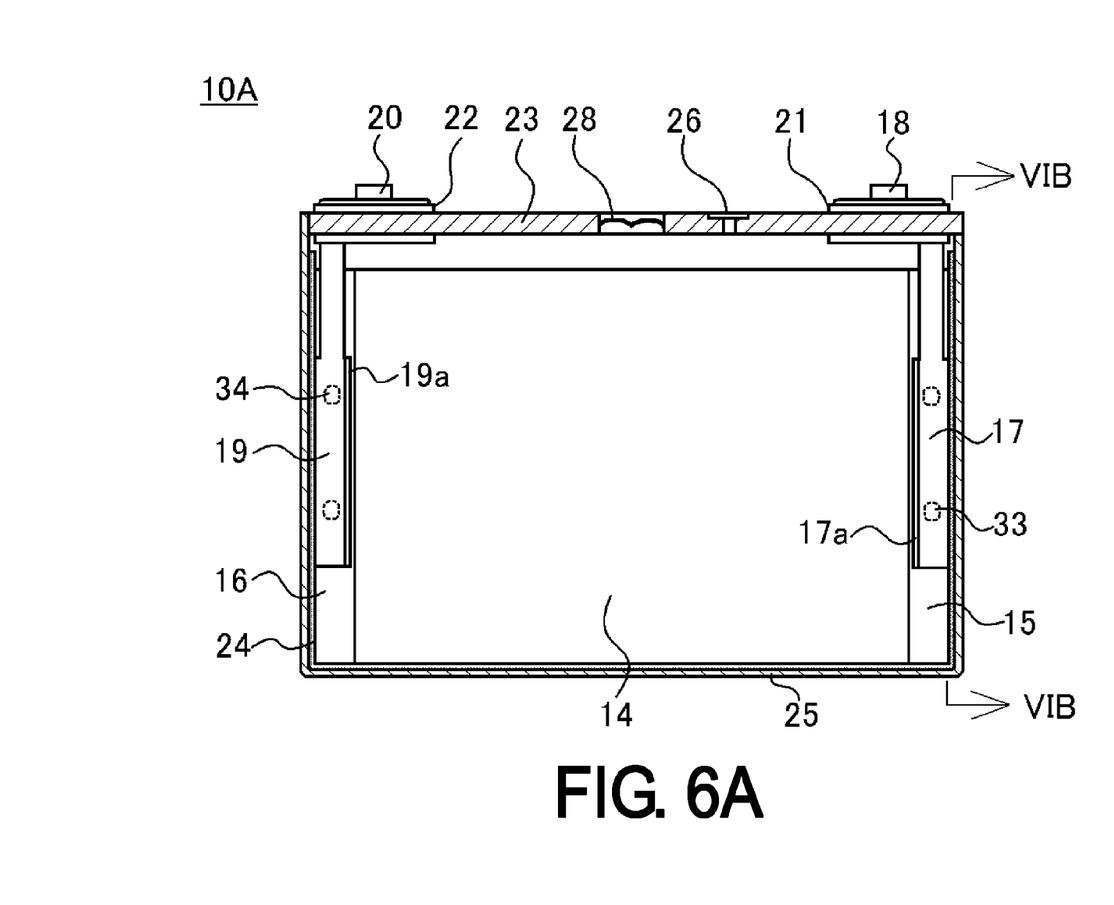
FIG. 6A is a fragmentary sectional view of a prismatic nonaqueous electrolyte secondary battery in accordance with a second modification, corresponding to FIG. 2A.
Figure 6B:
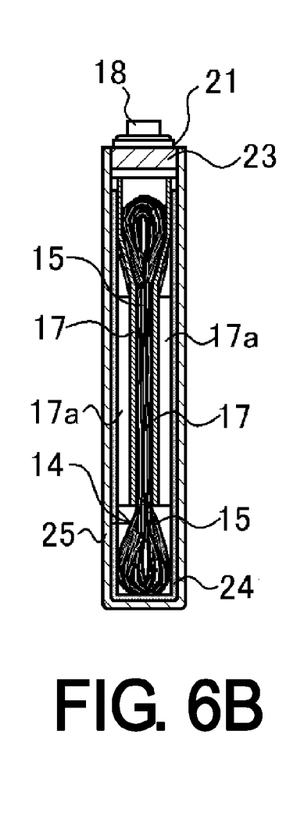
FIG. 6B is a sectional view along line VIB-VIB of FIG. 6A.

A prismatic nonaqueous electrolyte secondary battery 10A in accordance with a modification will be described with reference to FIG. 6, in which neither stacked layers of the positive electrode substrate exposed portion 15 nor stacked layers of the negative electrode substrate exposed portion 16 are divided into two segments and neither a positive electrode conductive member nor a negative electrode conductive member is used. In FIG. 6, like numbers are given to like components corresponding to the prismatic nonaqueous electrolyte secondary battery 10 of the embodiments shown in FIG. 2, and the detailed description thereof is omitted. In the flat winding electrode assembly 14 of the modification, a resistance welded portion between the positive electrode substrate exposed portion 15 and a positive electrode collector 17 and a resistance welded portion between the negative electrode substrate exposed portion 16 and a negative electrode collector 19 are different in formation material but are substantially similar in structure. Thus, FIG. 6B shows a side view of the positive electrode substrate exposed portion 15 as an example, and a side view of the negative electrode substrate exposed portion 16 is not shown.

In the flat winding electrode assembly 14 used in the prismatic nonaqueous electrolyte secondary battery 10A of the second modification, the amounts per unit area of a positive electrode active material mixture layer 11a of the positive electrode 11 and a negative electrode active material mixture layer 12a of the negative electrode 12 are larger than those in Embodiment 1. The winding number of the positive electrode 11 and the negative electrode 12 are 35 and 36, respectively. In other words, the total numbers of stacking layers of the positive electrode 11 and the negative electrode 12 are 70 and 72, respectively. The design capacity is 25 Ah. Furthermore, the total numbers of stacking layers of the positive electrode substrate exposed portion 15 and the negative electrode substrate exposed portion 16 are 70 and 72, respectively. On the positive electrode 11 side, the positive electrode collector 17 is disposed on the surfaces of both sides of the outermost side of the stacked layers of the positive electrode substrate exposed portion 15. On the negative electrode 12 side, the negative electrode collector 19 is disposed on the surfaces of both sides of the outermost side of the stacked layers of the negative electrode substrate exposed portion 16. The resistance welding is performed at two points so that weld marks (not shown in the drawings) are formed so as to pass through the whole stacked layer portions of the stacked positive electrode substrate exposed portion 15 or the stacked negative electrode substrate exposed portion 16. FIG. 6 shows the weld mark 33 formed at two points in the positive electrode collector 17 by resistance-welding and the weld mark 34 formed at two points in the negative electrode collector 19 by resistance-welding.

In the flat winding electrode assembly 14 used in the prismatic nonaqueous electrolyte secondary battery 10A of the second modification, the rib 17a formed onto the positive electrode collector 17 and the rib 19a formed onto the negative electrode collector 19 are formed across the two resistance welding points.

In the prismatic nonaqueous electrolyte secondary batteries 10 and 10A of Embodiments 1, 2 above and the first and second modifications, LiBOB or $LiPF_2O_2$ is added to the nonaqueous electrolyte. However, in the prismatic nonaqueous electrolyte secondary battery of the invention, both LiBOB and $LiPF_2O_2$ are preferably added to the nonaqueous electrolyte at the same time. The prismatic nonaqueous electrolyte secondary batteries 10 and 10A of Embodiments 1, 2 above and the first and second modifications show an example of adding LiBOB to the nonaqueous electrolyte as an additive. However, in the invention, lithium difluoro(oxalato)borate, lithium tris(oxalato)phosphate, lithium difluoro(bisoxalato)phosphate, lithium tetrafluoro(oxalato)phosphate, for example, may be used as a lithium salt having an oxalate complex as an anion.

The nonaqueous electrolyte secondary battery of Embodiments 1, 2 and the first and second modifications shows an example in which the integrated positive electrode collector 17 or the integrated negative electrode collector 19 is connected to both of the outermost sides of the positive electrode substrate exposed portion 15 or both of the outermost side of the negative electrode substrate exposed portion 16. However, the positive electrode collector 17 or the negative electrode collector 19 may be connected to only one side of the outer utmost sides of the positive electrode substrate exposed portion 15 or of the outermost sides of the negative electrode substrate exposed portion 16, and a mere collector receiving member may be disposed on the other side.

The nonaqueous electrolyte secondary batteries of Embodiments 1, 2 and the first and second modifications show an example of connecting between the positive electrode substrate exposed portion 15 and the positive electrode collector 17 and between the negative electrode substrate exposed portion 16 and the negative electrode collector 19 by resistance-welding, but the connection can be made by ultrasonic welding or irradiation of high-energy rays such as a laser. Furthermore, different connections may be made on the positive electrode side and the negative electrode side.

The invention claimed is:

1. A nonaqueous electrolyte secondary battery comprising:
   a flat electrode assembly including
      a positive electrode having a positive electrode substrate exposed portion and
      a negative electrode having a negative electrode substrate exposed portion;
   a bottomed prismatic hollow outer can storing the flat electrode assembly and a nonaqueous electrolyte and having an opening portion; and a sealing plate sealing the opening portion of the hollow outer can, the positive electrode substrate exposed portion having an area being 500 cm$^2$ or more, the negative electrode substrate exposed portion having an area being 700 cm$^2$ or more, the area of the negative electrode substrate exposed portion being larger than the area of the positive electrode substrate exposed portion, the nonaqueous electrolyte containing at least one of a lithium salt having an oxalate complex as an anion and lithium difluorophosphate (LiPF$_2$O$_2$) at the time of making the nonaqueous electrolyte secondary battery, and the outer surface area of a battery outer body including the hollow outer can and the sealing plate being 350 cm$^2$ or more.

2. The nonaqueous electrolyte secondary battery according to claim 1, wherein
the hollow outer can is made using pure aluminum.

3. The nonaqueous electrolyte secondary battery according to claim 1, wherein
the sealing plate is made using aluminum alloy.

4. The nonaqueous electrolyte secondary battery according to claim 1, wherein
the positive electrode and the negative electrode each have an elongated shape, the flat electrode assembly is formed by winding the elongated positive electrode and the elongated negative electrode with an elongated separator interposed therebetween, the positive electrode substrate exposed portion is wound and disposed on one end of the flat electrode assembly, the negative electrode substrate exposed portion is wound and disposed on the other end of the flat electrode assembly, the wound positive electrode substrate exposed portion has both outermost sides thereof connected to a positive electrode collector, and the wound negative electrode substrate exposed portion has both outermost sides thereof connected to a negative electrode collector.

5. The nonaqueous electrolyte secondary battery according to claim 4, wherein
the negative electrode substrate exposed portion is formed on both ends of the negative electrode in a width direction along the longitudinal direction.

6. The nonaqueous electrolyte secondary battery according to claim 4, wherein
the positive electrode collector has a rib formed in a region facing a positive electrode substrate exposed portion and on an end of the center side of the flat winding electrode assembly, and
the negative electrode collector has a rib formed in a region facing a negative electrode substrate exposed portion and on an end on the center side of the flat winding electrode assembly.

7. The nonaqueous electrolyte secondary battery according to claim 1, wherein
the lithium salt having the oxalate complex as an anion is contained in the nonaqueous electrolyte in an amount of 0.01 to 2.0 mol/L at the time of making the nonaqueous electrolyte secondary battery.

8. The nonaqueous electrolyte secondary battery according to claim 1, wherein
the lithium salt having the oxalate complex as an anion is lithium bis(oxalato)borate (Li[B(C$_2$O$_4$)$_2$]).

9. The nonaqueous electrolyte secondary battery according to claim 1, wherein
LiPF$_2$O$_2$ is contained in the nonaqueous electrolyte in an amount of 0.01 to 2.0 mol/L at the time of making the nonaqueous electrolyte secondary battery.

10. The nonaqueous electrolyte secondary battery according to claim 1, wherein
the nonaqueous electrolyte contains at least one of the lithium salt having the oxalate complex as an anion and lithium difluorophosphate (LiPF$_2$O$_2$).

11. The nonaqueous electrolyte secondary battery according to claim 1, wherein
the sealing plate has an outer surface which is 1.05 times or more as large as an outer surface area of the bottom of the outer can.

12. The nonaqueous electrolyte secondary battery according to claim 1, wherein
the sealing plate has an outer surface which is 1.1 times or more as large as an outer surface area of the bottom of the outer can.

13. A nonaqueous electrolyte secondary battery comprising:
a flat electrode assembly including
a positive electrode having a positive electrode substrate exposed portion and
a negative electrode having a negative electrode substrate exposed portion;
a bottomed prismatic hollow outer can storing the flat electrode assembly and a nonaqueous electrolyte and having an opening portion; and
a sealing plate sealing the opening portion of the hollow outer can,
the positive electrode substrate exposed portion having an area being 500 cm$^2$ or more,
the negative electrode substrate exposed portion having an area being 700 cm$^2$ or more,
the area of the negative electrode substrate exposed portion being larger than the area of the positive electrode substrate exposed portion,
the nonaqueous electrolyte containing at least one of a lithium salt having an oxalate complex as an anion and lithium difluorophosphate (LiPF$_2$O$_2$), and
the outer surface area of a battery outer body including the hollow outer can and the sealing plate being 350 cm$^2$ or more.

14. The nonaqueous electrolyte secondary battery according to claim 13, wherein
the sealing plate has an outer surface which is 1.05 times or more as large as an outer surface area of the bottom of the outer can.

15. The nonaqueous electrolyte secondary battery according to claim 13, wherein
the sealing plate has an outer surface which is 1.1 times or more as large as an outer surface area of the bottom of the outer can.

* * * * *